(12) United States Patent
Attili

(10) Patent No.: US 9,946,665 B2
(45) Date of Patent: Apr. 17, 2018

(54) FETCH LESS INSTRUCTION PROCESSING (FLIP) COMPUTER ARCHITECTURE FOR CENTRAL PROCESSING UNITS (CPU)

(75) Inventor: Narain Venkata Surendra Attili, Bangalore (IN)

(73) Assignee: MELANGE SYSTEMS PRIVATE LIMITED, Bangalore (IN)

(*) Notice: Subject to any disclaimer, the term of this patent is extended or adjusted under 35 U.S.C. 154(b) by 427 days.

(21) Appl. No.: 14/116,758

(22) PCT Filed: May 14, 2012

(86) PCT No.: PCT/IN2012/000349
§ 371 (c)(1),
(2), (4) Date: Nov. 8, 2013

(87) PCT Pub. No.: WO2012/156995
PCT Pub. Date: Nov. 22, 2012

(65) Prior Publication Data
US 2014/0136818 A1      May 15, 2014

(30) Foreign Application Priority Data
May 13, 2011 (IN) .......................... 1659/CHE/2011

(51) Int. Cl.
| G06F 15/00 | (2006.01) |
| G06F 15/76 | (2006.01) |
| G06F 13/16 | (2006.01) |
| G06F 9/30  | (2018.01) |
| G06F 9/38  | (2018.01) |
| G06F 15/80 | (2006.01) |

(52) U.S. Cl.
CPC ............ G06F 13/16 (2013.01); G06F 9/3004 (2013.01); G06F 9/30087 (2013.01); G06F 9/3893 (2013.01); G06F 15/8007 (2013.01)

(58) Field of Classification Search
None
See application file for complete search history.

(56) References Cited

U.S. PATENT DOCUMENTS

| 4,488,228 A | 12/1984 | Crudele et al. |
| 4,541,048 A | 9/1985 | Propster et al. |
| 5,537,562 A * | 7/1996 | Gallup .................. G06N 3/063 712/13 |
| 5,659,780 A * | 8/1997 | Wu ...................... G06F 15/8015 708/315 |
| 5,963,746 A * | 10/1999 | Barker ................ G06F 15/8007 709/238 |
| 6,141,765 A * | 10/2000 | Sherman ............. G06F 13/4217 713/400 |

(Continued)

Primary Examiner — George Giroux

(57) ABSTRACT

Fetch Less Instruction Processing (FLIP) Computer Architecture for Central Processing Units (CPU). This embodiment relates to computing systems, and more particularly to central processing units in computing systems. The principal object of this embodiment is to provide a Fetch Less Instruction Processing (FLIP) computer architecture using FLIP elements as building blocks for computer program processing. Another object of the embodiment is to use a protocol to interconnect FLIP elements, which makes the current operating systems, program execution models, compilers, libraries and so on to be easily transitioned to the FLIP computer architecture with minimal changes.

15 Claims, 13 Drawing Sheets

(56) References Cited

U.S. PATENT DOCUMENTS

| | | | |
|---|---|---|---|
| 6,728,862 B1 | 4/2004 | Wilson | |
| 8,327,187 B1* | 12/2012 | Metcalf | G06F 13/4221 714/10 |
| 2005/0160253 A1* | 7/2005 | Lescure | G06F 15/8023 712/22 |
| 2006/0179429 A1* | 8/2006 | Eggers | G06F 8/458 717/151 |
| 2006/0200610 A1 | 9/2006 | Yasue et al. | |
| 2009/0058568 A1 | 3/2009 | Dutta | |
| 2010/0111088 A1* | 5/2010 | Olofsson | G06F 15/17381 370/392 |
| 2011/0219208 A1* | 9/2011 | Asaad | G06F 15/76 712/12 |
| 2012/0303933 A1* | 11/2012 | Manet | G06F 15/17337 712/30 |

* cited by examiner

FIG 2

| Physical Address | Instructions |
|---|---|
| 0x8000 | mov r0, r1 |
| 0x8004 | mov r0, #1 |
| 0x8008 | cmp r1, #0 |
| 0x800c | beq lr |
| 0x8010 | mul r0, r1, r0 |
| 0x8014 | sub, r1, r1, #1 |
| 0x8018 | cmp, r1, #0 |
| 0x801c | bne pc, #-0xc |
| 0x8020 | b lr |

US 9,946,665 B2

FETCH LESS INSTRUCTION PROCESSING (FLIP) COMPUTER ARCHITECTURE FOR CENTRAL PROCESSING UNITS (CPU)

PRIORITY DETAILS

The present application is a National Phase Application for PCT application No. PCT/IN2012/000349 based on and claims priority from IN Applications bearing No. 1659/CHE/2011 filed on 13 May 2011, the disclosure of which is hereby incorporated by reference herein.

TECHNICAL FIELD

This embodiment relates to computing systems, and more particularly to central processing units in computing systems.

BACKGROUND

A central processing unit (CPU)/processor of a computer fetches instructions in a sequence from a memory into the CPU, decodes the instruction, executes and performs a write back into the memory. The CPU makes use of various units like a fetch unit, a program counter, and memory interface units including registers and stacks. To make the above process of computer program instruction processing faster, the CPU architecture has been evolving. Processor architecture related features like instruction pipelining, branch prediction, superscalar processors, vector processors, multithread processing etc have been implemented successfully. Also high speed cache memories are being used which require separate control and related logic for operation. Use of multiple processors on a single chip allows the chip to process different instructions simultaneously.

In spite of all the architectural developments and implementations a large amount of the processing time is still spent in fetching instructions and waiting for memory to respond. There is a major mismatch between the speed at which the processor works and speed at which data/instruction can be accessed/fetched from memory-memory processing speed. The processor architecture related features improve processing speeds of computers but memory processing speed still lags behind by a huge margin.

To reduce this speed mismatch, various new processor architectures and approaches have been emerging. One approach involves combining logic with memory. Processors produced using this approach is described as IRAM—Intelligent Random Access Memory. (DRAM is preferred as it is denser than SRAM). IRAM processor approach reduces the speed mismatch as the processor and memory are on the same chip allowing improved access speeds. The IRAM architecture also has other advantages like higher bandwidth, lower access latency, energy efficiency and reduces memory space. Another approach called MPPA—Massively Parallel Process Array allowing multiple CPU's and RAM memories to be coupled/placed on to same chip. Each processor may run its own instruction set with the help of assigned memory. Variations of this idea have also been implemented in an architecture called "Processing In Memory" (PIM). In literature, "Active memories" is another name used for describing similar approaches.

The above approaches provide processors and associated local memory connected through fast interconnects. Tasks are scheduled on this processor based on the data availability within different local memories. One host processor generally has control over the computer operations. Because of the better integration technology of the processor and memory, memory access speed in increased. The main problem with the above approach is the significant software and tool chain changes required to support the current software programming models. Many of the above referred architectures specify their own software programming models, tools, programming languages, compilers, etc., which would render using currently prevailing models impractical.

SUMMARY

The principal object of this embodiment is to provide a Fetch Less Instruction Processing (FLIP) computer architecture using FLIP elements as building blocks for computer program processing.

Another object of the embodiment is to use a protocol to interconnect FLIP elements, which makes the current operating systems, program execution models, compilers, libraries and so on to be easily transitioned to the FLIP computer architecture with minimal changes.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This embodiment is illustrated in the accompanying drawings, throughout which like reference letters indicate corresponding parts in the various figures. The embodiments herein will be better understood from the following description with reference to the drawings, in which:

FIG. 2 shows an example of how instructions gets loaded into FLIP elements for a factorial function execution, according to embodiments as disclosed herein;

DETAILED DESCRIPTION OF EMBODIMENT

Figure 1:
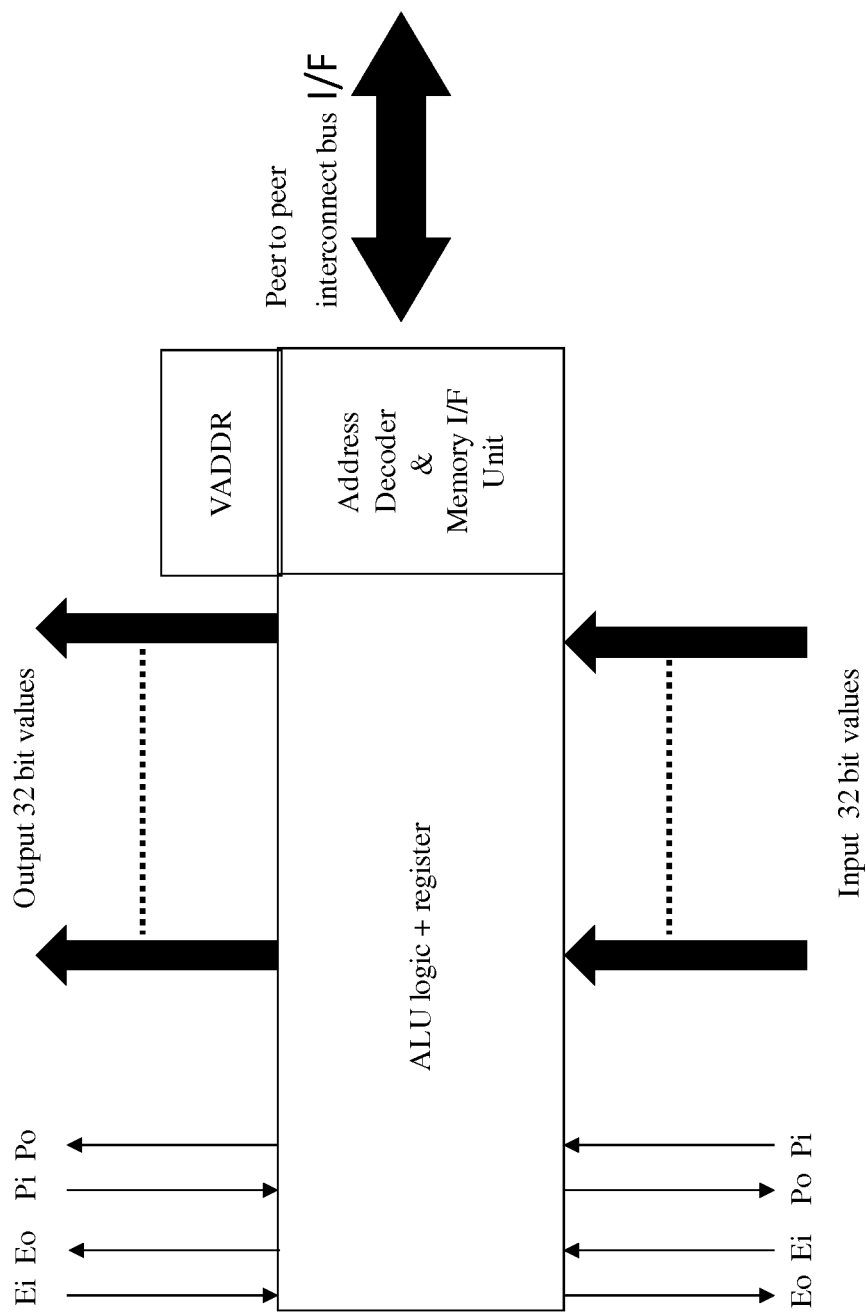
FIG. 1 depicts a FLIP element, according to embodiments as disclosed herein.
Figure 3:
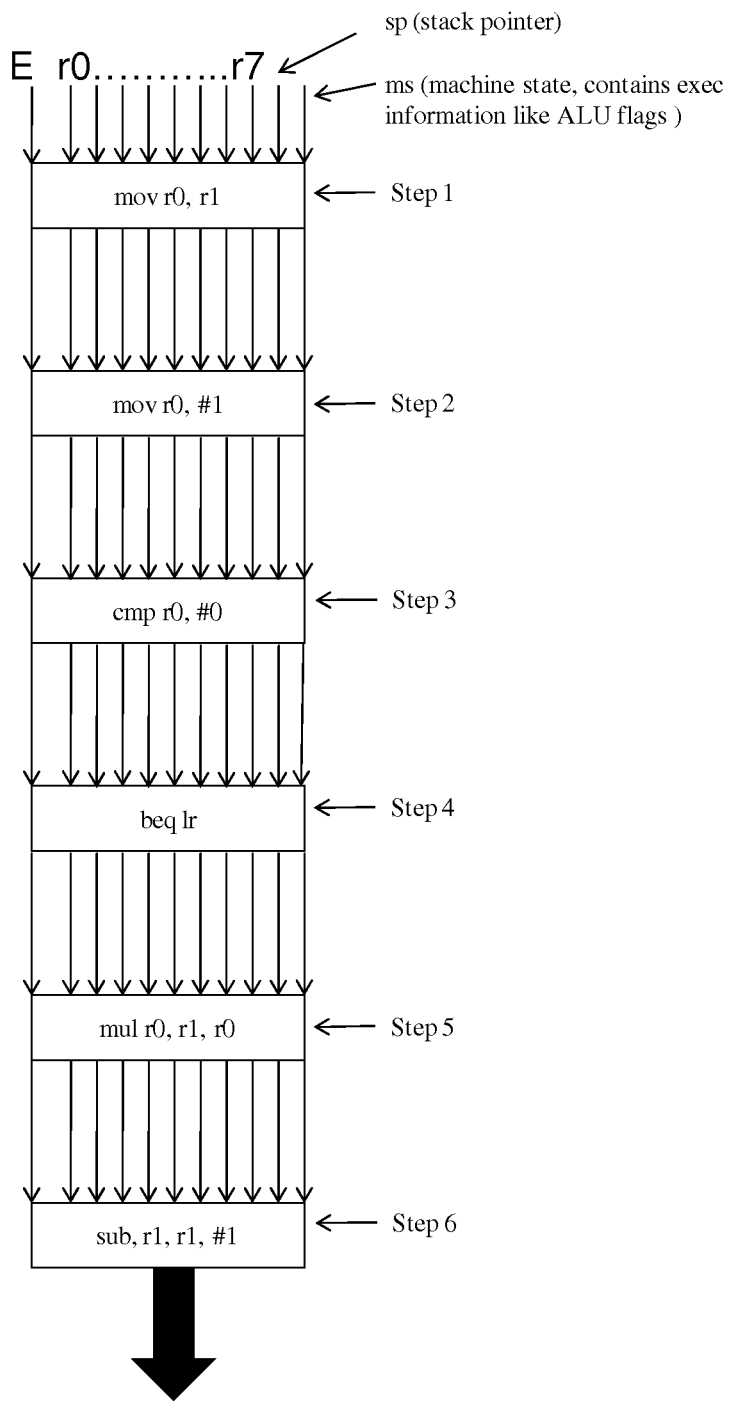
FIGS. 3a and 3b shows the signal detail of FLIP elements as an instruction is executed using FLIP elements, according to embodiments as disclosed herein.
Figure 3:
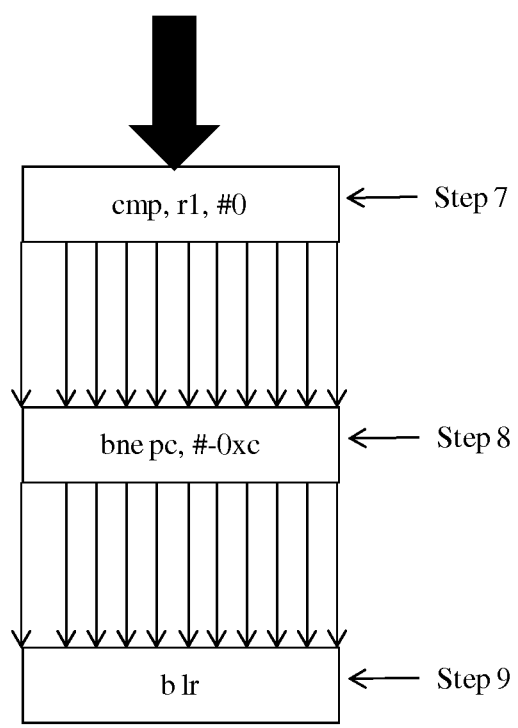

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a Fetch Less Instruction Processing (FLIP) computer architecture using FLIP elements as building blocks for computer program processing. Referring now to the drawings, and more particularly to FIGS. 1 through 13, where similar reference characters denote corresponding features consistently throughout the figures, there are shown preferred embodiments.

FIG. 1 depicts/illustrates a FLIP element, according to embodiments as disclosed herein. The FLIP element combines an Instruction Execution Unit (IEU) with a register unit. The instruction execution unit is a common ALU—Arithmetic and Logic Unit used in processors. The register with which the ALU is combined may be one or a combination of static RAM, dynamic RAM, Flash memory or a NVRAM (Non-Volatile RAM). The FLIP elements are organized in an array and interconnected using a high speed memory interconnects (MI). The FLIP element can hold both data as well as instructions. A FLIP element can have an optional register file and a stack associated with it. The FLIP element can also execute instructions. Data stored in FLIP elements may be accessed by instructions present in other FLIP elements. Instructions are executed based on an execute signal passed from one FLIP element to another after completion of instruction stored in a FLIP element. Besides execute signal other signals may be used to pass information from one FLIP element to another. These signals perform a function similar to registers which hold information. The signals shown in FIG. 1 of the FLIP element are essential signals required for FLIP element instruction processing.

Ei—Execute signal to the current FLIP element. When this signal is asserted, the Instruction Execution Unit (IEU) operates on the data in the FLIP element and generates an output. Output data is passed on the next FLIP element and inputs which have not been processed are also passed to the output.

Eo—This signal is the execute signal to the next FLIP element. When an element has finished processing and has an output, this Eo signal is generated and used to assert the next FLIP element.

Pi/Po—Pass signals. These signals indicate if the execution should pass through the FLIP element. The instruction stored in the FLIP element is not executed. No operation—NOP done by FLIP element. One of the input could be a counter which decrements. IF the counter is 0, then the Pi signal will not be passed to the next FLIP element and instruction will be executed in the current FLIP element itself. These signals can be used for creating different branches or threads.

Execution through the FLIP elements can move in forward direction, or in backward direction. But implementations can choose if backward execute signal passing can be implemented or not. If backward execute signal passing through FLIP elements is not implemented, then the Memory interconnect will have to be used for backward branches.

Another signal not shown in the figure, but is an implementation option is the clock signal. Execution signal passing from FLIP element to FLIP element could be on a clock signal, or clock less, depending on just E signal and an acknowledgement signal (not shown in the pictures).

The input/output lines are implementation dependent word sized inputs or outputs. Upon receiving an Ei signal, the FLIP element gets in the assertive/active modes. The FLIP element then operates on a subset of inputs and generates outputs. The FLIP element may also be used to generate a control action to propagate the execute signal to a specific FLIP element located elsewhere. The figure currently shows two input/output lines—one input line for use in stack and another input line for regular inputs. Although only 2 input/output lines are shown in the figure, the number of input/output lines can vary from implementation to implementation. Executing code sequences require their own arithmetic flags and machine state register. These arithmetic flags and machine state register should be signaled on the I/O lines and passed from element to element through I/O line. Far away branches should save the machine state to the stack so that it is available to the far branch target. This can be done by certain explicit program instructions, or done automatically by hardware whenever a far branch instruction is executed. FLIP elements have been used just for data storage so that existing programming models can be easily shifted to this FLIP CPU architecture. Each FLIP element can either hold data/text or instructions. The FLIP elements locations can be fixed based on programming load scenarios for holding text or data. In simpler embedded systems, data areas may be set aside with simple RAM units. Text area could be FLIP elements. Let us consider a simple factorial function and understand how FLIP signals operate together or instruction execution. The factorial function int fact (int n)
{int i, fact=1;
for (i=n; i !=0; i--)
fact *=i;
return (fact);}

FIG. 2 shows an example of how instructions gets loaded into FLIP elements for a factorial function execution, according to embodiments as disclosed herein. The physical address of each FLIP element where instructions are loaded can be seen. Each line of the instructions gets loaded in a sequential manner into FLIP elements. Each of these FLIP elements holds the instruction and operates on the held instruction and passes on result to the next FLIP element in the sequence.

FIGS. 3a and 3b shows the signal detail of FLIP elements as an instruction in executed using FLIP elements, according to embodiments as disclosed herein. In step 1, r0=N, all other registers, not used now. The registers and E signal sent to this FLIP element over the peer to peer interconnect bus. Output signals r1==r0; no other changes occur. In step 2, which happens in the next FLIP element, the r0 output signal will indicate #1 after this. Other signals will be unchanged. In step 3, in the next FLIP elements r0 is compared with #0 and a machine state is set. Other signals remain unchanged. At step 4, the machine state is used and in case the result of the comparison r0==0, a communication is started over the peer to peer interconnect bus. The next flip element performs multiplication instruction at step 5. Signals r1 and r0 are multiplied and result comes out on r0 signal. At step 6, a subtraction instruction is performed. #1 is subtracted form from r1 inputs and reflects it on r1 output. Next, an r1 input is compared to #0 and a machine state is set and passed on to next FLIP element at step 7. In step 8, based on the flags in the machine state, a conditional branch may be formed to get execution back by 12 addresses. For this E and P signals will be passed, with implementation dependent manner of indicating the branch offset. It is an advantage not to use the peer to peer interconnect bus; but that option is available as well. In the final step 9, Function return, pc is loaded lr, E signal and register signals are passed on to the Memory interconnect signals.

Figure 4:
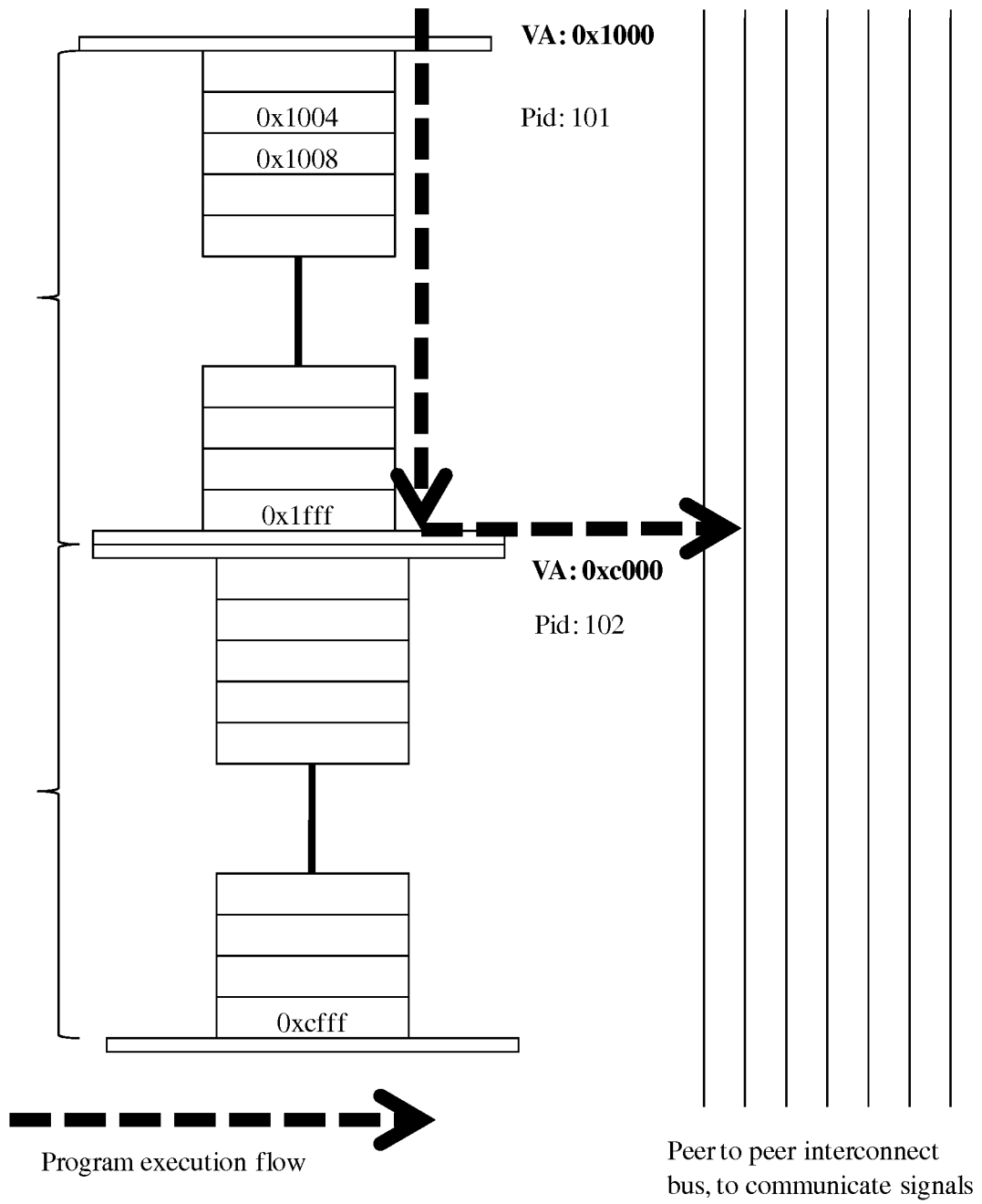
FIG. 4 illustrates how operations are performed by FLIP pages, according to embodiments disclosed herein.

FIG. 4 illustrates how operations are performed by FLIP pages, according to embodiments disclosed herein. FLIP elements may be grouped to form a FLIP page. The number of FLIP elements per page can vary based on implementation. A most common size for a FLIP page may be 1024 FLIP elements in a single page. In this case, a FLIP page may have 1024 32-bit words or 4096 8-bit bytes. The page size may have no particular significance in non-virtual memory systems, they would be an important component in virtual memory supporting CPUs. FIG. 4 shows two different FLIP pages, allocated to two different processes with ID 101 and 102 respectively. At the page boundary, execution cannot continue to the next address/page which has been allocated to another process. The FLIP element at the page boundary will communicate the E signal and registers over peer to peer interconnect bus, this time including the PID and the Virtual address over the bus. The FLIP page that is configured for PID 101 and virtual address 0x2000 will pick up the E signal and register values and continue execution.

Figure 5:
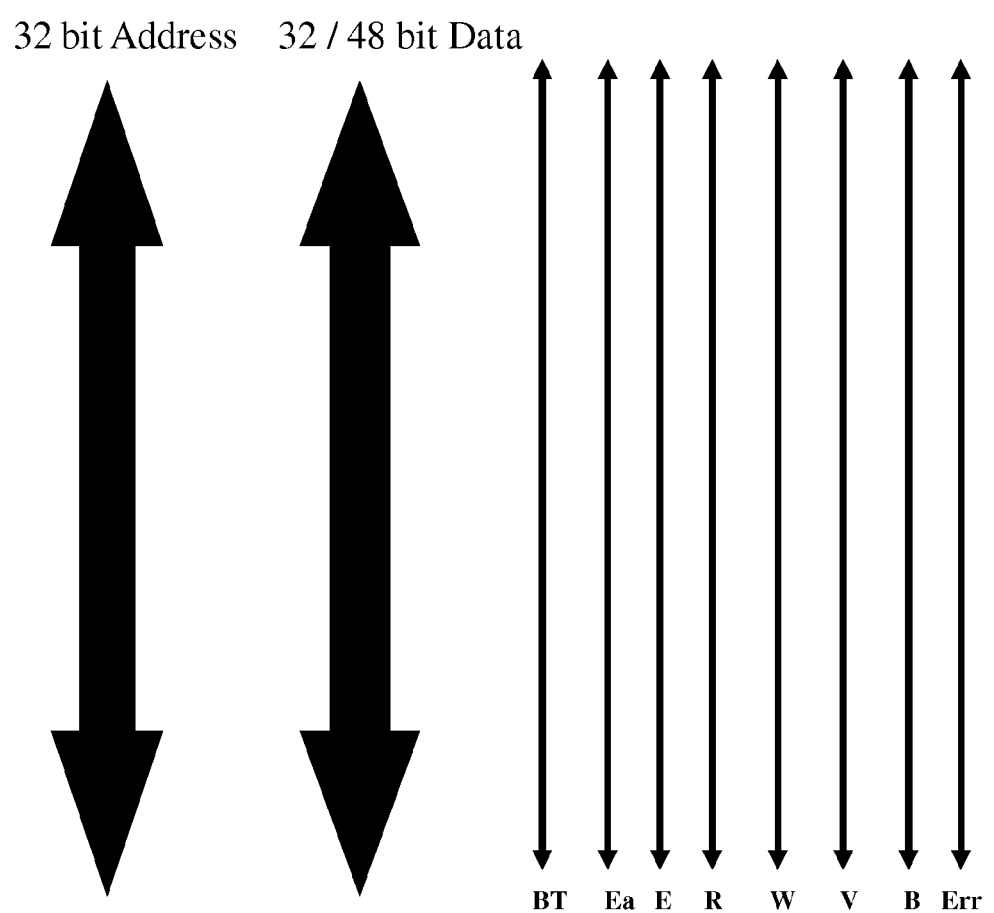
FIG. 5 depicts Memory Interconnect (MI) signal lines used to interconnect FLIP elements through the peer to peer interconnect bus, according to embodiments as disclosed herein.

FIG. 5 depicts/illustrates Memory interconnect (MI) signal lines used to interconnect FLIP elements through the memory interconnect bus, according to embodiments as disclosed herein. All FLIP elements connect to the FLIP interconnect bus. This peer to peer interconnect bus is used to load values from the FLIP elements, store values into the FLIP elements and to pass various different types of signals. For example, The Ei signal-execute signal is passed from one FLIP element to the other. The signals shown in FIG. 2 are used to control operations in FLIP elements and they operate through the peer to peer interconnect bus. Some of the signals are required when supporting a virtual memory machine. The peer to peer interconnect bus may also be called FLIP element interconnect bus as it essentially helps in controlling FLIP element operations. Some of the common operation achieved using these signals are listed below:

Sending next execute address: Signal Ei is asserted. The execute address in placed on the address bus; the stack address is available on the data bus. An Ea-assert acknowledgement must be received back within a time limit; else this may be taken as an exception. The address may be a physical address or a virtual one. In case of a virtual memory, a process ID-PID is part of the data bus.

Storing a value: Signal W is asserted. The target address is available on the address bus. The value is present on the data bus. The address may be a physical address or a virtual one. In case of a virtual memory, a process ID-PID is part of the address bus.

Read a value: Signal R is asserted. The target address is there on the address bus. The value to be read is placed by FLIP element on the data bus. The address may be a physical address or a virtual one. In case of a virtual memory, a process ID-PID is part of the address bus.

Set virtual page number of the target element (For virtual memory implementations): V and W are asserted. The 32 bit address should be the physical address of the FLIP element; the data bus would contain the PID and the virtual address on the 48 bit bus. The only instance when the address is interpreted as a physical address is when the V is asserted.

Calling shared text (For virtual memory implementations): Signals V and E are asserted. The 32 bit address would be the physical address of the element; the data bus would contain implementation dependent parameter. PID field would be ignored. The only instance when the address is interpreted as a physical address is when the V is asserted.

Busy Indication: The target FLIP element may assert a B signal to one or other responses. The originator trying to access the FLIP element gives the peer to peer interconnect bus and retries after 0 . . . N cycles later. This happens if the target address is actually executing an instruction; other possible busy situations will be implementation specific.

Error Indication: An Err signal is asserted. If cyclic redundancy check is included in the data and it fails, an error signal is asserted.

To prevent bottlenecks, task stalling and other issues, 2 separate peer to peer interconnect buses can be implemented. One exclusively for load/store of FLIP elements and another for execute signal propagation.

There could be multiple execution sequences running in the FLIP computer; some of them may be loading values into the element, some storing; some may be changing execution paths and therefore passing E value. The multiple execution sequences would contend for the memory interconnects bus. Contention resolution has to be used to decide and sort usage of memory interconnects bus. The contention resolution bus/es is to allow only one FLIP element access to the interconnect bus at any one time. To decide on who may use the peer to peer interconnect bus, various methods may be implemented. An arbiter may be used to decide who gets the bus, based on a FLIP raised interrupt like request. This method requires an interrupt line per FLIP element. The arbiter may be useful when the number of FLIP elements on the implemented system is very small.

In an embodiment herein, an external hardware that polls FLIP elements for request of bus use is another may be used. It may be possible for the scheduler like hardware to track where the current execution sequences are and poll them to see if they have put out a request.

In another embodiment herein, a peer to peer type model may also be used allocating the peer to peer interconnect bus. In this method, the FLIP element that would like to access the peer to peer interconnect bus/FLIP connect bus would first read the E/R/W/V and the contention resolution bus. If all the signal lines are in not-asserted state, it would place a potentially unique number, could be a thread ID or a process ID on to the contention resolution bus. If the contention resolution bus has the number the FLIP element has placed, the FLIP Connect bus is considered allocated. The FLIP element which has claimed the bus would go ahead and place the correct signal in E/R/W/V lines and go ahead with the operation. Block transfers have been provisioned for. Block transfers are transfers where multiple data entities (register values for example) are communicated over the peer to peer interconnect bus using appropriate signals and clock. If the FLIP element finds the bus to be engaged, it will wait for a designated number of cycles and retry again. If a Busy or an Error message comes once again, the FLIP element's Memory Interface Unit will have to retry the bus operation. Although a peer to peer model is presented here, but this model should not be limiting the scope of this embodiment in any way. One realization of peer to peer model is a switching circuit between FLIP elements. The evolving technical domain of "Network On Chip" can provide alternative protocols for the said implementation.

As many tasks run on the processor which frequently access the FLIP peer to peer interconnect bus, it can potentially turn into a bottleneck, stalling tasks and other code sequences. An implementation can implement "page zones"; page boundaries that do not propagate AVMI signals out of a range of pages. Or these can be propagated on the basis of learning. Provisioning for atomic read, test and write. Page boundaries—intelligence embedded in the interconnect technology that recognizes the address where a particular FLIP page starts and ends. Page zones are an arbitrary group of FLIP pages across which it may be desirable to propagate the memory signals because they do some related data processing, and, it may also be desirable to limit signal propagation within these boundaries.

Once the program starts, then all execution is autonomous; multiple programs could be executing simultaneously in different FLIP elements/pages. PC relative branches can be implemented as pass signals with offset decrements. Absolute branches are implemented as E signal propagation to the target address; in virtual memory systems, addresses are virtual, but physical address based branches will have to be supported as well.

Figure 6:
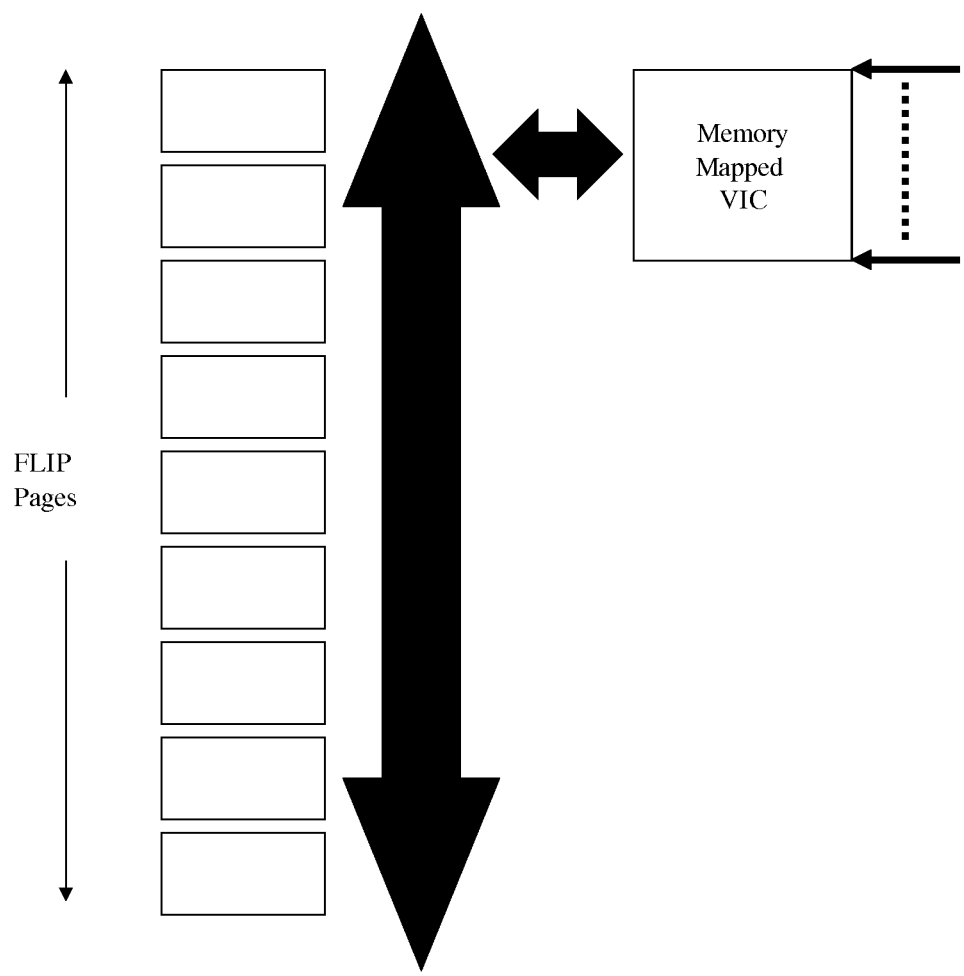
FIG. 6 illustrates an interrupt controller working in a FLIP computer architecture, according to embodiments as disclosed herein.
Figure 7:
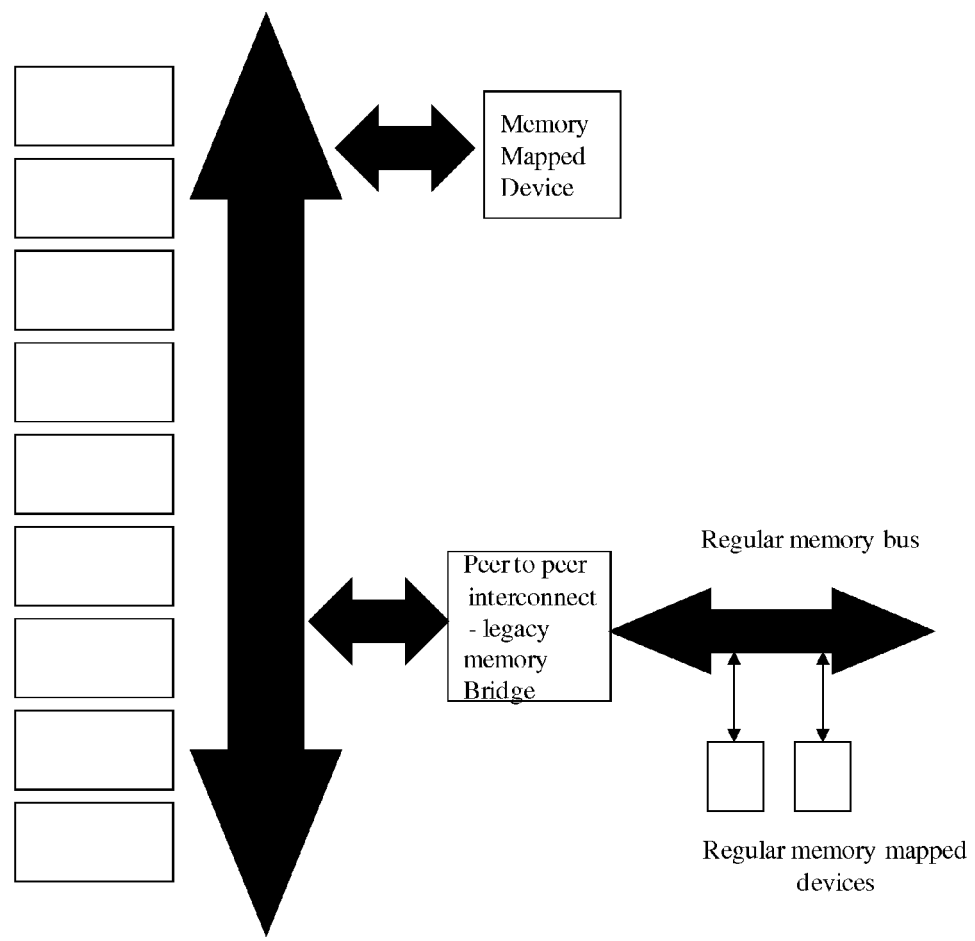
FIG. 7 illustrates how devices can be interfaced with the FLIP computer architecture, according to embodiments as disclosed herein.

FIG. 6 depicts/illustrates how an interrupts controller works in FLIP computer architecture, according to embodiments as disclosed herein. Interrupt handling is a critical component of how a processor responds to externally connected devices. Currently, devices called Interrupt controllers or Programmable Interrupt controllers or Vectored interrupt controllers are used to interface between interrupting devices and related code to be executed in the processor. The current standard approach is to "memory map" the interrupt controller device—the device is seen by processing units as a memory address, but a special one. A memory mapped interrupt controller is programmed with vector addresses and corresponding stacks to use. On an interrupt, the interrupt controller will send out an E signal to the appropriate execute location (vector location) along with the related stack. This type of interrupt operation will make interrupt latency practically non-existent. Interrupts are executed completely in independent sequences. An interrupt stack and related code can be placed in the same page zones so that easy and reduced contention to stack is available FIG. 7 illustrates how devices can be interfaced with the FLIP computer architecture, according to embodiments as disclosed herein. External devices may directly be interfaced on to the FLIP interconnect bus. Another approach of interfacing devices involves a bridge device (between peer to peer interconnect bus and normal memory of a CPU). This bridge device allows the peer to peer interconnect bus to access devices connected to the regular memory bus. The device address are loaded and stored for any operations related to the devices.

Figure 8:
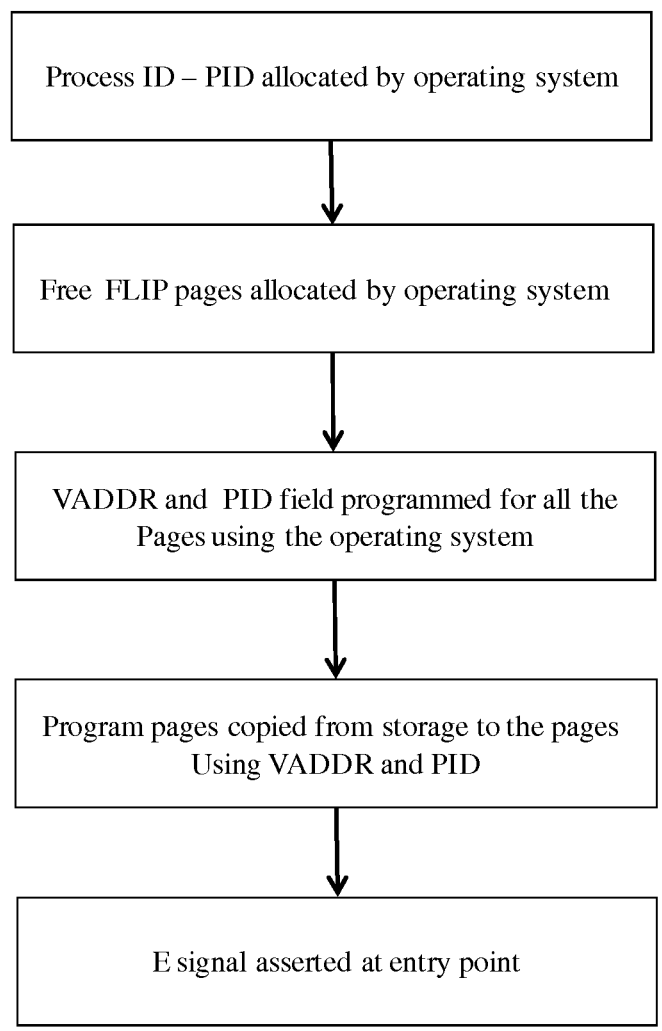
FIG. 8 is a flowchart explaining how a FLIP computer architecture supports virtual memory, according to embodiments as disclosed herein.

FIG. 8 is a flowchart explaining how FLIP computer architecture supports a virtual memory, according to embodiments as disclosed herein. The FLIP processor architecture is geared towards high end virtual memory is an essential in high end processing. The features requiring support would be virtual address, demand paging, user address fault detection, random physical page location-contiguous virtual support and user mode tracking and policing process.

The compiler tool chain generates virtual addresses. The OS allocates a page to start with for text, data and stack each. Part of the allocation is to set the virtual addresses in the pages through a setvaddr instruction. This uses physical address on MI and virtual address and PID are passed on the data bus. Then the actual copy of program data starts. In theory, the virtual address locations are being overwritten with real virtual address content. PID is allocated by operating system. Free pages are located by operating system. VADDR and PID field programmed for all the located pages using the operating system. Program pages copied from storage to the pages using VADDR and PID. E signal is asserted at the entry point.

As the program executes, at far branches as well as page boundaries, there will be E signal propagated to the next virtual address. Branches are explicit in the programs and code saves registers to stack as required before branching (sending the E signal). At page boundaries, execution cannot seamlessly continue as the next physical page need not be a contiguous virtual address. The PID and next VADDR field are placed on the FLIP interconnect bus, and a block transfer is initiated to the target virtual address setting the registers the initial values of the registers. All the registers have to be copied automatically in the hardware. Appropriate signals are to be issued—here BT signal on the FLIP peer to peer interconnect bus is issued transferring the register state to the new execution location. Registers are transferred one after another on a clock. If Ea is not asserted for the address after the first write on to the peer to peer interconnect bus, then, this is to be a memory fault, or an access violation If an address access over the peer to peer interconnect bus did not receive an Ea signal within a clock, the element would automatically do a block register transfer to a preset memory location (Err), indicating cause of error. The possible errors could be: Page next errors, write error, read error, execute next error and other errors as significant in implementations. The Err memory location is a location that exists at an implementation dependent special address (virtual and responds to all PIDs), which triggers an MMU—memory management unit fault kernel code execution sequence. This sets of the page fault handler code sequence, including new page allocation if necessary, or execution halt and page freeing as required.

Kernel addresses are policed at FLIP element and the FLIP memory interconnect interface. An instruction that has tried to access kernel address space will trigger an MMU call memory management unit fault kernel code execution sequence. This sets of the page fault handler code sequence, including new page allocation if necessary, or execution halt and page freeing as required. Part of virtual address setting of pages is to set the PID and VADDR fields as described before. Since Virtual address setting only needs a subset of address fields, the remaining can be used to set permissions—Read Only/Read-Write/Do-not-Execute, etc. Once the permissions are set, the FLIP element is required to do the basic policing.

FLIP elements need to do some FLIP Connect signal handling correctly—Ea not being received on clock is an error. FLIP elements at page boundaries need to have self awareness that they are a page boundary and accordingly signals discussed in the previous slides are to be implemented.

The initial code should execute out of NVRAM area; either a regular microprocessor can execute on a regular NVRAM, or executable instruction sequences can be placed in an FLIP-NVRAM from where execution shall commence. This code will copy the OS and other control code as necessary from disk/NVRAM areas to FLIP element arrays and issue an E signal to the kernel entry point. A program can be loaded into FLIP pages by OS by using appropriate instruction sequences. Once the necessary pages are loaded, the OS gives an E signal to the starting address, passing the stack value, setting of a completely independent execution sequence. Once the program starts, then all execution is autonomous; multiple programs could be executing simultaneously in different FLIP pages. PC relative branches can be implemented as pass signals with address decrements. Absolute branches are implemented as E signal propagation to the target address; in virtual memory systems, addresses are virtual, but physical address based branches will have to be supported as well.

In non-virtual memory systems, text/instruction space is frequently shared. We need a mechanism to execute shared code. Given that shared text is usually accessed through function calls, this problem is easily solved. All functions that are compiled as part of shared text will start with a lock instruction—tlock. Before returning from this function, a tunlock <tlock_addr> instruction will unlock this function. Signals will have to be provided for this signal on the FLIP Connect bus or through the P signals. For example a non-zero count pass signal will not be allowed through a locked location. This can be used to unlock. Any branch to a "tlock"ed location will return a B signal. This is a potential stall in calling program. Any function call, whether shared or not within a locked area may open up the lock until control comes back to originally locked function. Instead of locking the whole shared function only the critical section of the code is locked. Only the register initialization from stack (if any) or register saves to stack (if any) are truly a critical section. Rest of the shared text can be truly shared. Some high priority code sequences can ask for "copy on block" implementations where the shared text would be copied into a separate memory area and executed. In another embodiment there could be multiple copies of shared functions. There will be a single address for a function that will actually direct branches to different function copies.

One instruction of a shared function may be executing on behalf of one task, while the next instruction may be executing on behalf of another task. Eventually a return instruction is just a branch back to an address in the stack, along with the stack pointer. Shared text execution is therefore interleaved at an instruction level for efficient mullet-threaded support, but for the critical sections which should be protected by additional lock instructions.

Implementation without Virtual Memory. Given that standard memory organization of programs in this embodiment is similar to current implementations, therefore, operating systems need not be significantly changed. Support for System calls, semaphores and Task block/task unblock sequences is essential.

System calls are usually a special instruction (scall) that automatically takes execution to a pre-defined address. Every FLIP element will be designed to pass an E signal to a predefined address along with appropriate data values over the FLIP interconnect bus.

A sem instruction should provide for an atomic test and set; While a linked load/store conditional option has its advantages, a simpler instruction would just hold the bus, read, check and write to the target address. The atomic test and set instruction will:

1. After successful contention resolution on the FLIP Connect bus assert both RW signals; When RW signals are asserted, the target will always respond to R first; once R is done, the target will be ready for write.

2. Linked Load/Store Conditional OR Load Exclusive and Store Exclusive like implementation need not be ruled out as long as the implementation complexity can be handled.

During program execution, tasks do not always execute—they frequently sleep, waiting for some event. When the event occurs, the task is made ready to run and based on the priority will be scheduled. When a task is blocked, some other task is scheduled and if no task is waiting for the CPU an idle loop/idle task is scheduled. Now, in our embodiment, task blocking/unblocking would still happen, but with no attendant reschedule like operation. Block instruction will halt the execution. No further E signal will be propagated. Register value retention is implementation dependent. Block code sequence push Ri-Rn [Optional register storage on to the stack]
    stst <flag_addr+4> [Store the stack pointer]
    stnxt <flag_addr+8> [Store the instruction address to execute on wake up]
    block Unblock code sequence. This will be executed in the wake up event code. exec flag_addr+8, flag_addr+4; Issue E at execute address while initializing the stack pointer. stnxt may require a FLIP element to be self aware in terms of physical or virtual address. If the implementation is not possible, an idle loop on flag may be necessary—but with power consumption implications.

Figure 9:
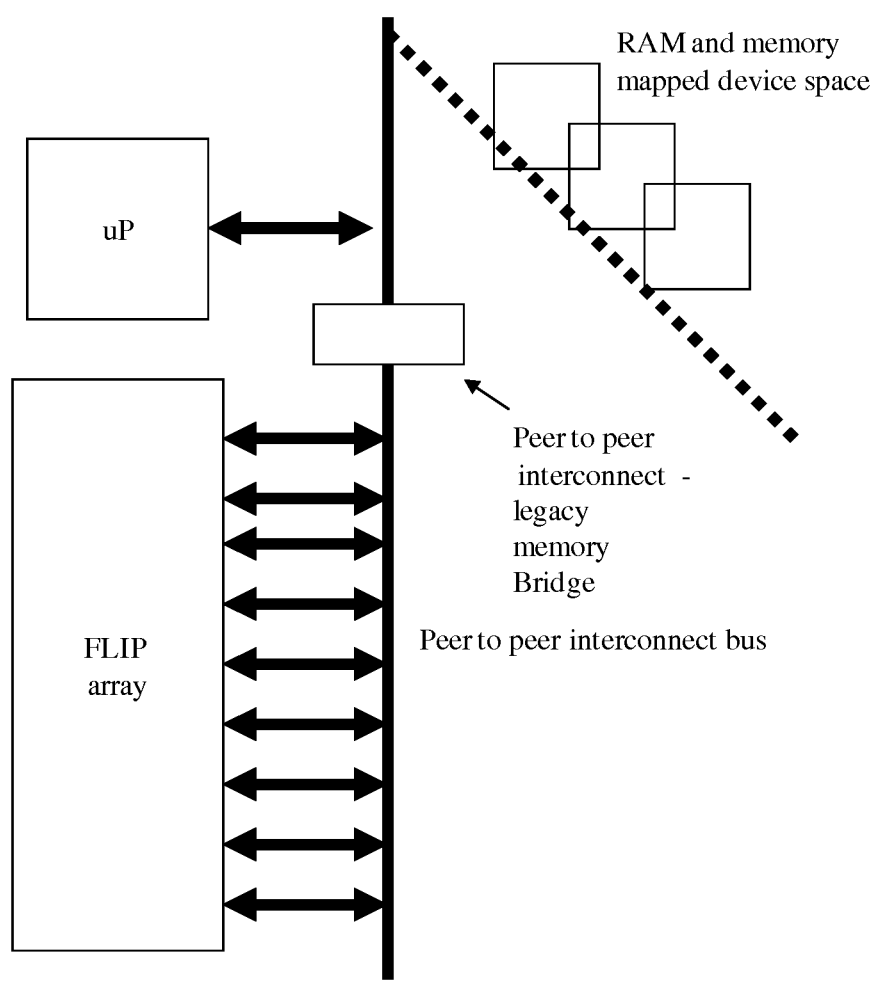
FIG. 9 illustrates how the FLIP architecture may be interfaced and implemented along with devices/processor based on currently available legacy devices, according to embodiments disclosed herein.

FIG. 9 illustrates how the FLIP architecture may be interfaced and implemented along with devices/processor based on currently available legacy device, according to embodiments disclosed herein. In this implementation the microprocessor and the FLIP array communicate using the peer to peer interconnect bus. A Memory Interconnect-memory bridge is used to connect the other devices to the operating system. A bridge device connects two different communicating technologies together. One side of the bridge device is the new peer to peer interconnect bus, and on the other side of the bridge device is the legacy memory interface bus. The bridge device will do the necessary technology conversion for signals on one bus to the correct form and protocol of the other bus.

Figure 10:
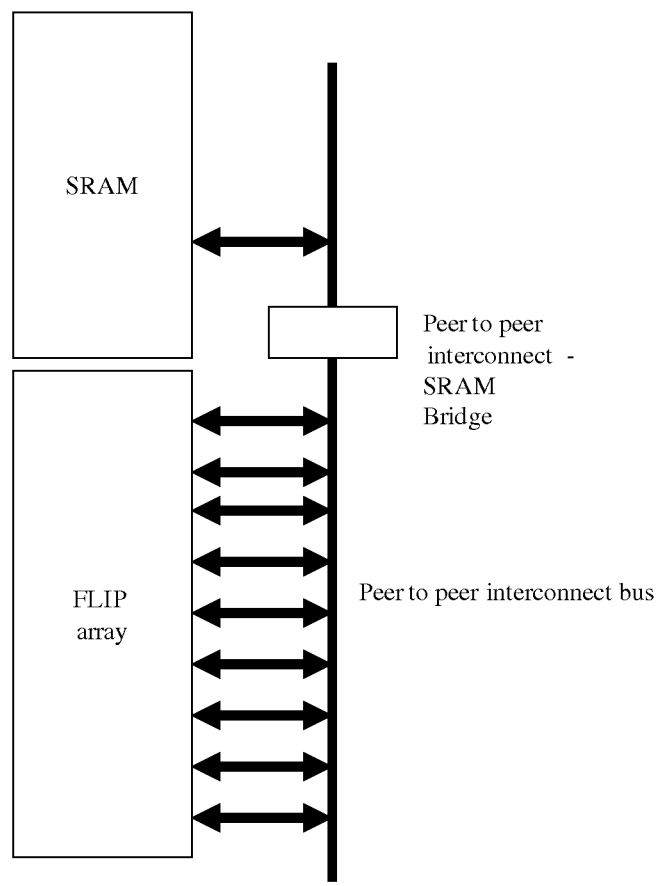
FIG. 10 illustrates how the FLIP architecture may be interfaced and implemented along with devices/processor based on currently available legacy devices, according to embodiments disclosed herein.

FIG. 10 illustrates how the FLIP architecture may be interfaced and implemented along with devices/processor based on currently available legacy device, according to embodiments disclosed herein. In this implementation, text will be loaded into FLIP pages and data into SRAM. Many high end systems can be implemented in this fashion, with the only distinction between a pure FLIP implementation and this hybrid model is that data and text physical pages are segregated. The virtual memory model should work seamlessly as both the SRAM and FLIP pages can be part of the same task VAS.

Figure 11:
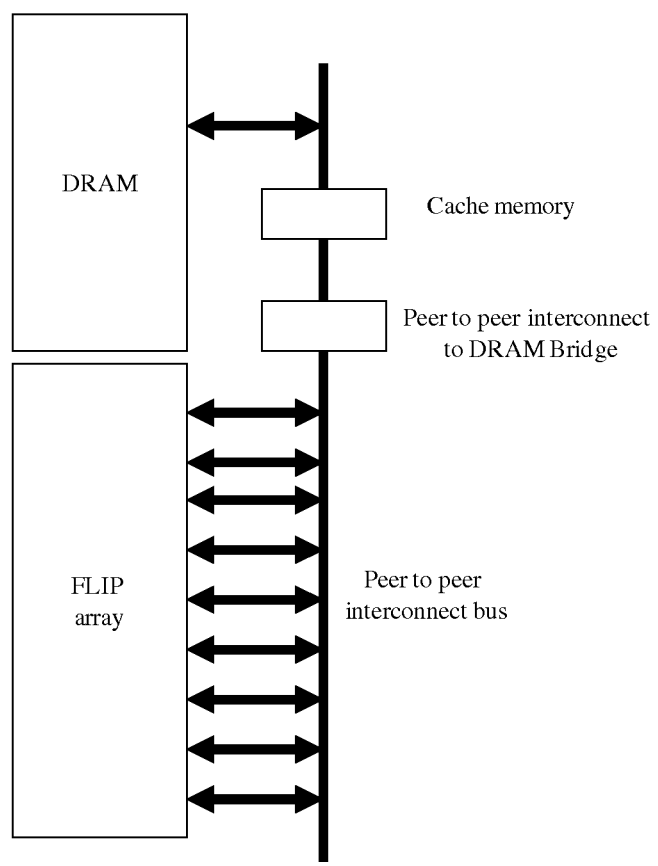
FIG. 11 illustrates how the FLIP architecture may be interfaced and implemented along with devices/processor based on currently available legacy devices, according to embodiments disclosed herein.
Figure 12:
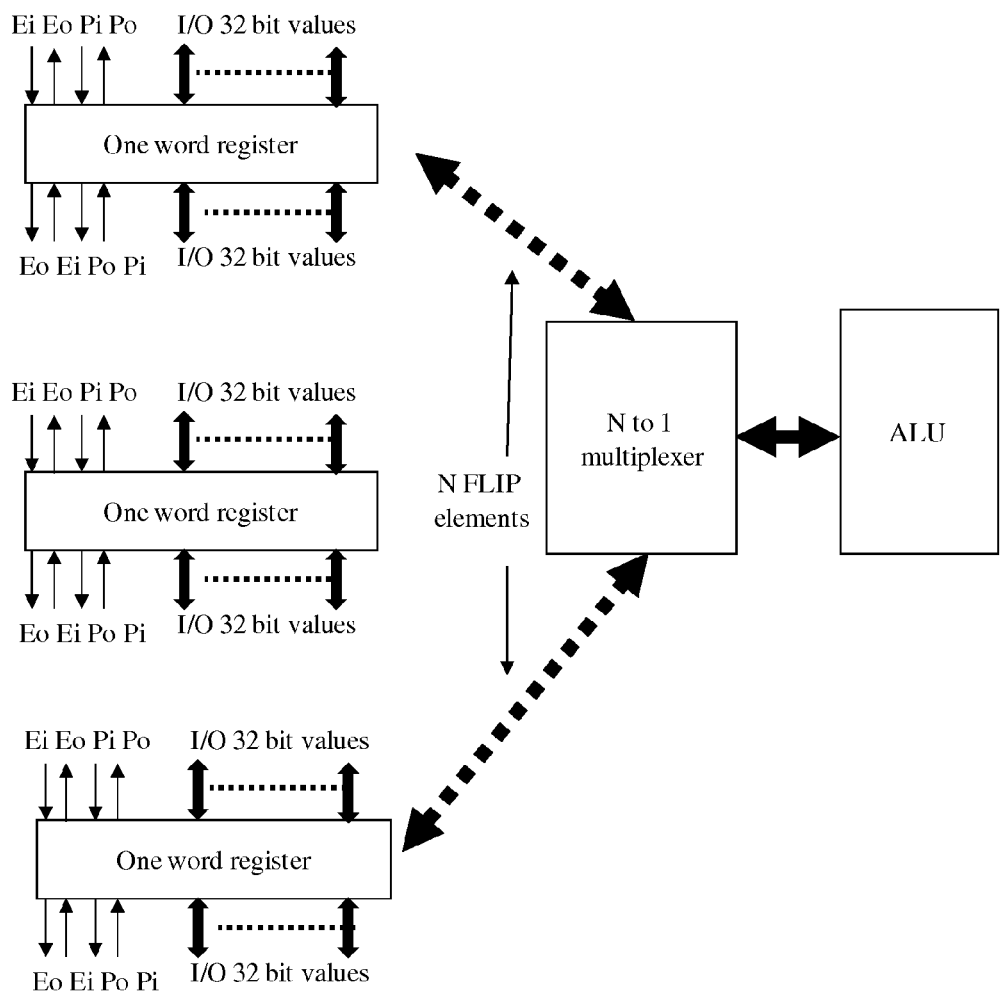
FIG. 12 depicts the ALU being shared by multiple FLIP elements, according to embodiments as disclosed herein.

FIG. 11 illustrates how the FLIP architecture may be interfaced and implemented along with devices/processor based on currently available legacy device, according to embodiments disclosed herein. In this implementation, text will be loaded into FLIP pages and data into DRAM/Caches. Many high end systems can be implemented in this fashion, with the only distinction between a pure FLIP implementation and this hybrid model is that data and text physical pages are segregated. The virtual memory model should work seamlessly as both the RAM and FLIP pages can be part of the same task VAS FIG. 12 illustrates how the FLIP architecture may be interfaced and implemented along with devices/processor based on currently available legacy device, according to embodiments disclosed herein. The ALU is shared across multiple FLIP elements. The multiplex will connect a FLIP element to the ALU based on self selection, the element with E signal will be connected to the ALU. All I/O lines being multiplexed. The FLIP element selects the inputs to multiplex based on "instruction decode". Similarly output is picked from ALU output and correctly placed on the output bus. A further enhancement here could be small amount of register space in this ALU so that local variables could be placed, thereby minimizing accesses to the Memory Interconnect.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

I claim:

1. A Fetch Less Instruction Processing (FLIP) processor comprising of a plurality of FLIP elements,
   wherein each FLIP element from said plurality of FLIP elements comprises a memory unit and a logic unit for execution of instructions,
   wherein each said FLIP element pre-stores one of data and instruction, and
   wherein each said FLIP element is configured to:
   receive an input execute signal, and
   execute said instruction resident in said memory unit and generates output signals including an explicit execute signal to be passed to another FLIP element from said plurality of FLIP elements,
   wherein the output signals from each said FLIP element is directly connected to another FLIP element,
   wherein each said FLIP element comprises of an interface to a high speed interconnect bus implemented on said FLIP processor, whereby each said FLIP element addresses other FLIP elements from said plurality of FLIP elements which are not directly connected to itself for sending said explicit execute signal and for performing at least one of read operations and write operations,
   wherein said instruction resident in one FLIP element from said plurality of FLIP elements can perform at least one of read operations and write operations from another FLIP element based on an explicit execute signal from a previous FLIP element from said plurality of FLIP elements,
   wherein the execution of said instruction, said read operations and write operations from another FLIP element, and the generation of said output signals is performed without accessing at least one of an external memory, an external instruction cache, and an external data cache, wherein communication is only among the FLIP elements within the plurality of FLIP elements.

2. The FLIP processor, as claimed in claim 1, wherein a subset of said each FLIP element share a common logic unit.

3. The FLIP processor, as claimed in claim 1, wherein said high speed interconnect bus are used to receive the read commands, write commands, and execute signal, wherein the high speed interconnect bus pass the execute signal from one FLIP element from said plurality of FLIP elements to a target FLIP element from said plurality of FLIP elements to trigger the target FLIP element to execute instruction resident in its memory unit for execution.

4. The FLIP processor, as claimed in claim 1, wherein said high speed interconnect bus are used to load values from said FLIP elements, wherein an output value from a previous FLIP element from said plurality of FLIP elements is stored as an input value to a next FLIP element from said plurality of FLIP elements through said high speed interconnect bus.

5. The FLIP processor, as claimed in claim 1, wherein said high speed interconnect bus are used to store values into said FLIP elements, wherein an output value from a previous FLIP element from said plurality of FLIP elements is loaded as an input value to a next FLIP element from said plurality of FLIP elements through said high speed interconnect bus.

6. The FLIP processor, as claimed in claim 1, wherein at least one of said FLIP elements have at least one of a register file and a stack pointer information given as signal inputs from another FLIP element either directly or over a high speed interconnect bus and output register information and stack information as output signals to one of next connected FLIP element directly and another FLIP element over said high speed interconnect bus without accessing at least one of the external memory, the external instruction cache, and the external data cache.

7. The FLIP processor, as claimed in claim 1, wherein at least two of said FLIP elements are grouped to form a page, wherein a FLIP element is capable of being pre-loaded with a process identifier and a virtual address information, wherein a FLIP element at a boundary of said page communicates an execution signal, register information, stack pointer information, process and virtual memory information over high speed interconnect.

8. The FLIP processor, as claimed in claim 1, wherein said FLIP processor is configured for performing contention resolution between said FLIP elements to determine usage of a high speed interconnect bus, wherein said contention resolution allows only one FLIP element access to said high speed interconnect bus at a given time.

9. The FLIP processor, as claimed in claim 8, wherein said FLIP processor is configured for performing contention resolution using interrupts.

10. The FLIP processor, as claimed in claim 8, wherein said FLIP processor is configured for performing contention resolution using an external hardware, wherein said external hardware is configured for performing polling.

11. The FLIP processor, as claimed in claim 8, wherein said FLIP processor is configured for performing contention resolution using a peer to peer model.

12. The FLIP processor, as claimed in claim 1, wherein said FLIP processor is configured for performing interrupt handling using a memory mapped interrupt controller, wherein said memory mapped interrupt controller is configured with a FLIP element address and corresponding input stack information, wherein said memory mapped interrupt controller sends an execute signal and stack information to said configured FLIP element address over a high speed interconnect bus on receipt of an external interrupt.

13. The FLIP processor, as claimed in claim 1, wherein said FLIP processor is configured to interface with external devices directly.

14. The FLIP processor, as claimed in claim 1, wherein said FLIP processor is configured to interface with external devices using a bridge device.

15. The FLIP processor, as claimed in claim 7, wherein said FLIP processor is configured for supporting at least one of virtual memory, virtual address, demand paging, user address fault detection, random physical page location-contiguous virtual support and user mode tracking and policing process.

* * * * *